D. P. SHAW.
STALK BREAKER.
APPLICATION FILED FEB. 19, 1908.
902,116.
Patented Oct. 27, 1908.
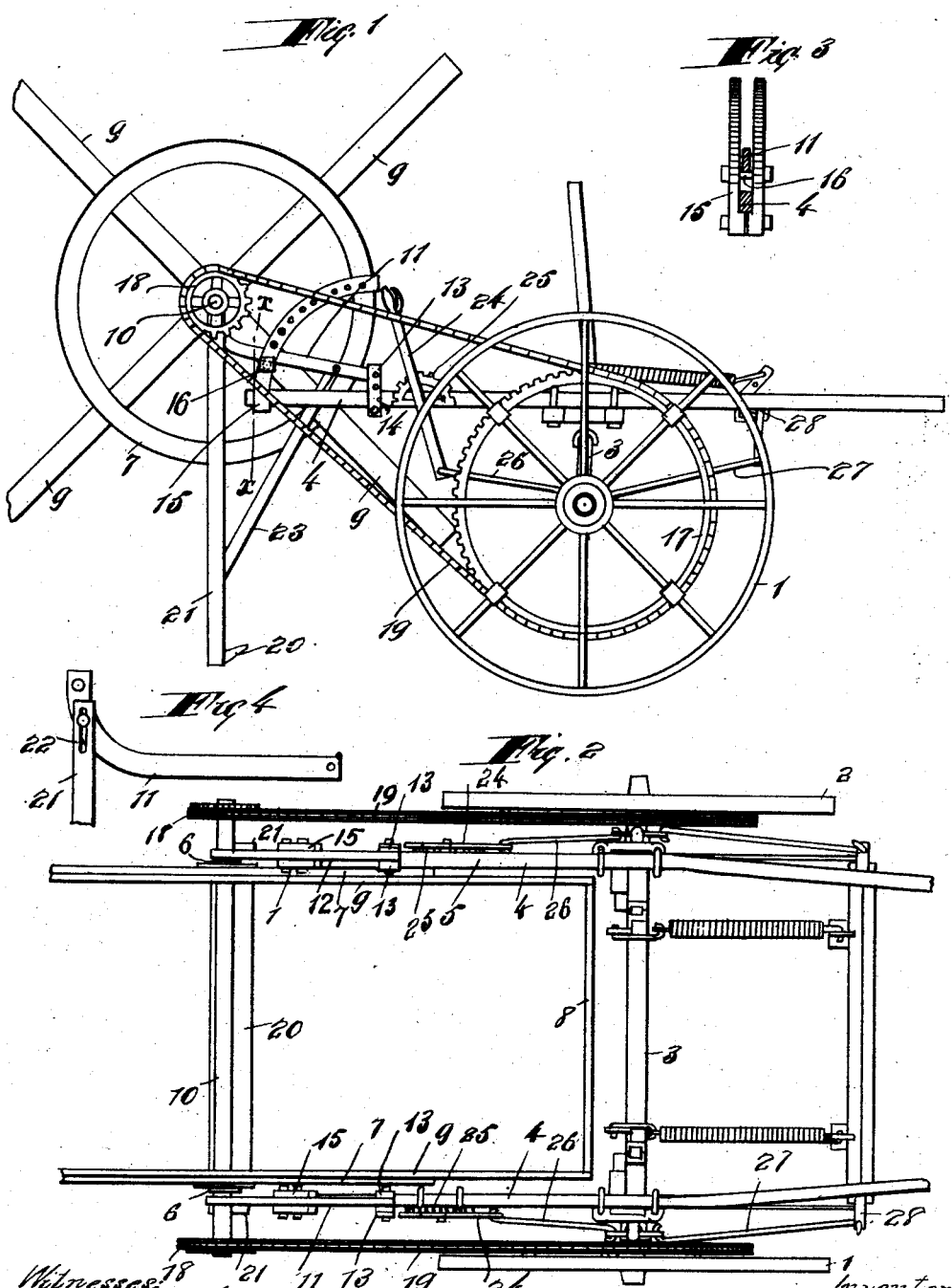

UNITED STATES PATENT OFFICE.

DRURY P. SHAW, OF RHOME, TEXAS, ASSIGNOR OF ONE-HALF TO W. J. TACKABERRY, OF FORT WORTH, TEXAS.

STALK-BREAKER.

No. 902,116.      Specification of Letters Patent.      Patented Oct. 27, 1908.

Application filed February 19, 1908. Serial No. 416,722.

*To all whom it may concern:*

Be it known that I, DRURY P. SHAW, a citizen of the United States, residing at Rhome, county of Wise, and State of Texas, have invented certain new and useful Improvements in Stalk-Breakers, of which the following is a specification.

My invention relates to improvements in devices for breaking such stalks as cotton stalks, and the object is to provide simple devices which may be attached to a suitable vehicle. I have provided a stalk breaker which may be attached to a cultivator frame.

Another object is to provide an adjusting means which will adapt the stalk breaker to break the stalks out of young wheat, or growing wheat plants without breaking the young plants.

Other objects and advantages will be fully explained in the following description and the invention will be more particularly pointed out in the claims.

Reference is had to the accompanying drawings which form a part of this application and specification.

Figure 1 is a side elevation of a stalk breaker, the reel of which is slightly broken away. Fig. 2 is a plan view of the same. Fig. 3 is vertical section of one of the reel supporting arms, taken along the line *x x* of Fig. 1. Fig. 4 is a detail view of one of the reel supporting arms, showing the manner of adjusting the hanging blade.

Similar characters of reference are used to indicate the same parts throughout the several views.

A cultivator and the wheels thereof are used for operating my improved stalk breaker. The wheels 1 and 2 support an axle 3 of the ordinary type for cultivators. The backwardly projecting beams 4 and 5 are utilized for mounting the reel. The reel is composed of the hub 6, circular frame pieces 7, blades 8 which are carried by the arms 9 which are attached to the hubs 6. The reel is mounted on a shaft 10 which is journaled in the reel carrying arms 11 and 12. The arms 11 and 12 are pivotally connected with the beams 4 and 5 by means of the upwardly projecting ears 13 of clamps 14 which are clamped on beams 4 and 5. The reel carrying arms are provided with guides 15 which are rigidly mounted on the ends of the beams 4 and 5. The guides 15 are provided with a number of perforations and supporting pins 16 are used to hold the arms 11 and 12 at the proper height. The arms 11 and 12 rest on the pins 16, but are free to rise up or yield upwards for the purpose hereinafter explained. The reels are driven by sprocket wheels 17 which are mounted on the wheels 1 and 2 and wheels 18 which are mounted on the reel shaft 10 and the sprocket-chains 19 which transmit the power from wheels 1 and 2 to wheels 18.

A breaking bar or blade 20 is hung on the arms 11 and 12 by means of the arms 21. The blade 20 is mounted just below the beat of the blades 8 and serves as a means against which the blades 8 break the stalks. The arms 21 are made adjustable on the reel carrying arms 11 and 12 so that the blade 20 may be raised or lowered, the arms 21 having slots 22 for this purpose. The object of this adjustment is to make the distance between the blade 20 and the blades 8 as they pass blade 20 greater where the machine is used to break cotton stalks standing among young wheat plants so that the wheat plants will not be cut or broken by the blades. The blade 20 is held rigid by the braces 23 which are attached to the arms 21 and to the reel carrying arms 11 and 12. The blade 20 will thus rise with the arms 11 and 12. The blade 20 is set at angle so that the blade will rise up and pass over all ordinary obstructions, the pivoted reel carrying arms permitting this upward movement.

The slack of the chains 19 is taken up by a lever 24 which is fulcrumed on the bar or beam 4. A rack 25 of the ordinary type is mounted on the beam 4 for holding the lever 24 at any suitable adjustment. The lever 24 is connected to the axle 3 by means of a link rod 26. The axle 3 is bent down at each end before entering the wheels 1 and 2 and the link rod 26 is connected to the lower part of the axle 3 so that the wheels 1 and 2 may be thrown forward or backward by the lever 24 to regulate the tension of the chains 19. The axle 3 is further braced by the link rod 27 which is connected to the arm of a rocking beam 28.

This improved breaker may be used for breaking old stalks out of wheat and other growing plants.

Having fully described my invention, what I claim as new and desire to secure by Letters Patent, is,—

1. The combination of a cultivator having backwardly projecting beams and a stalk breaking mechanism comprising a reel, a shaft for driving said reel, upwardly yielding arms pivotally connected to said beams and supporting said shaft, guides consisting of pairs of arms mounted rigidly on said beams for said upwardly yielding arms, pins coöperating with said guides to hold said reel at different elevations, and means for driving said reel at any elevation.

2. The combination of a wheeled cultivator having backwardly projecting beams and stalk breaking mechanism comprising a reel provided with a shaft, upwardly yielding arms pivotally connected to said beams and carrying said shaft, guides holding said arms at any desired elevation mounted on said beams, a sprocket wheel mounted on said shaft, a sprocket wheel mounted on one of the cultivator wheels, a sprocket chain transmitting the power of the cultivator wheel to said shaft, and a lever for taking up the slack of said sprocket chain.

3. The combination of a wheeled cultivator having backwardly extending beams and stalk breaking mechanism comprising a reel provided with a driving shaft, upwardly yielding arms pivotally connected to said beams and carrying said shaft, means attached to said beams for supporting said arms at any desired elevation and for guiding said arms, sprocket wheels mounted on said shaft, sprocket wheels mounted on the cultivator wheels, sprocket chains transmitting the power of said cultivator wheels to said shaft, levers for taking up the slack of said sprocket chains, and a blade provided with arms adjustably attached to said upwardly yielding arms and coöperating with said reel.

In testimony whereof, I set my hand in the presence of two witnesses, this 31st day of January, 1908.

DRURY P. SHAW.

Witnesses:
B. J. LORKOWSKI,
J. W. STITT.